US011618067B2

(12) United States Patent
Zolnowski et al.

(10) Patent No.: US 11,618,067 B2
(45) Date of Patent: Apr. 4, 2023

(54) METHOD AND APPARATUS FOR REMEDYING A NON-CONFORMING FEATURE OF AN ALUMINUM ALLOY PART

(71) Applicant: The Boeing Company, Chicago, IL (US)

(72) Inventors: Michael Ryan Zolnowski, St. Louis, MO (US); Elizabeth Adele Walker-Heckman, Hazelwood, MO (US)

(73) Assignee: The Boeing Company, Arlington, VA (US)

( * ) Notice: Subject to any disclaimer, the term of this patent is extended or adjusted under 35 U.S.C. 154(b) by 488 days.

(21) Appl. No.: 16/587,660

(22) Filed: Sep. 30, 2019

(65) Prior Publication Data

US 2021/0094085 A1    Apr. 1, 2021

(51) Int. Cl.
| | |
|---|---|
| *B23P 6/00* | (2006.01) |
| *B21D 7/16* | (2006.01) |
| *B21C 51/00* | (2006.01) |
| *B21D 7/02* | (2006.01) |
| *C22C 21/00* | (2006.01) |
| *C22F 1/04* | (2006.01) |

(Continued)

(52) U.S. Cl.
CPC .............. *B21D 7/162* (2013.01); *B21C 51/00* (2013.01); *B21D 7/02* (2013.01); *B23P 6/00* (2013.01); *C22C 21/00* (2013.01); *C22F 1/04* (2013.01); *G01L 1/00* (2013.01); *G01N 3/00* (2013.01)

(58) Field of Classification Search
CPC .. B23P 6/00; C22C 21/00; G01L 1/00; G01N 3/00; C22F 1/04
See application file for complete search history.

(56) References Cited

FOREIGN PATENT DOCUMENTS

| CN | 106181220 A | * 12/2016 |
|---|---|---|
| CN | 106181220 A | 12/2016 |

(Continued)

OTHER PUBLICATIONS

Extended European Search Report dated Nov. 10, 2020 in the corresponding European Patent Application No. 20194920.3.

(Continued)

*Primary Examiner* — Jamel E Williams
(74) *Attorney, Agent, or Firm* — Womble Bond Dickinson (US) LLP

(57) ABSTRACT

The present disclosure is directed to remedying a non-conforming feature of an aluminum alloy part. A method may include identifying a yield strength as a function of temperature for a designation of the aluminum alloy part, determining a stress to be applied to the feature to re-form the non-conforming feature to within a dimensional tolerance, correlating the stress to the identified yield strength to determine a process temperature of the part upon applying the stress to the feature, determining a time duration for applying the stress to the feature at the determined process temperature, and applying the stress to the feature of the part, the feature being restrained to oppose the stress, while heating the feature to the determined process temperature, and maintaining the application of the stress and the heat to the feature for the time duration in order to reform the restrained feature to within the dimensional tolerance.

10 Claims, 2 Drawing Sheets

Figure 1:
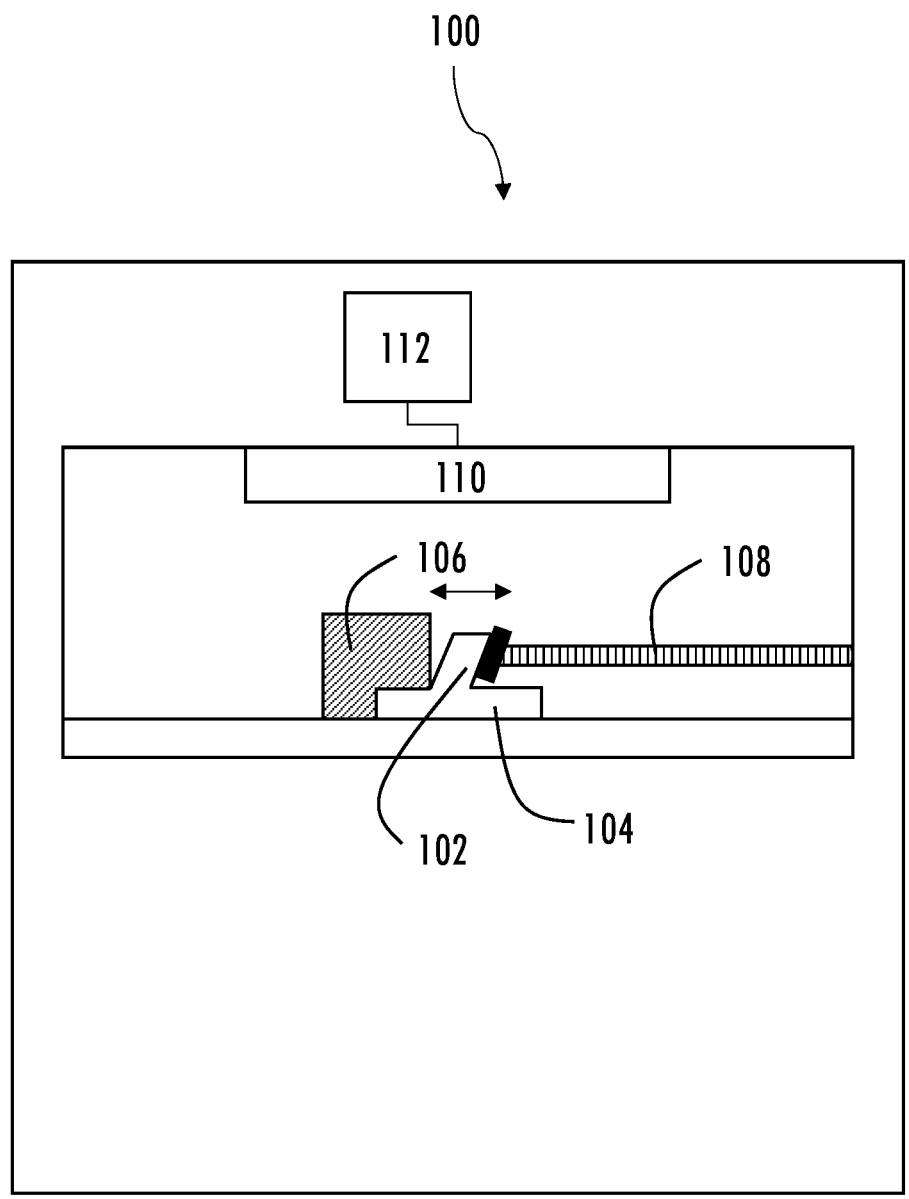

(51) Int. Cl.
　　　*G01L 1/00*　　　(2006.01)
　　　*G01N 3/00*　　　(2006.01)

(56) References Cited

FOREIGN PATENT DOCUMENTS

| | | |
|---|---|---|
| CN | 207138545 U | 3/2018 |
| DE | 10 2014 106 289 A1 | 11/2015 |

OTHER PUBLICATIONS

Siqueira, R. et al. Non-contact sheet forming using lasers applied to a high strength aluminum alloy. Journal of Materials Research and Technology, vol. 5, No. 3, Jul. 1, 2016, pp. 275-281. Retrieved from the Internet <URL: http://dx.doi.org/10.1016/j.jmrt.2016.02.002>.
Office Action dated Dec. 14, 2022, in corresponding European Patent Application No. 20194920.3.

* cited by examiner

METHOD AND APPARATUS FOR REMEDYING A NON-CONFORMING FEATURE OF AN ALUMINUM ALLOY PART

TECHNOLOGICAL FIELD

The present disclosure relates generally to aluminum alloy parts. More particularly, the present disclosure relates to a method and apparatus for remedying a non-conforming feature of an aluminum alloy part.

BACKGROUND

Wrought aluminum alloy parts are known to retain residual material stresses after being worked to shape. Such residual material stresses cause bending, twisting, and bowing of feature(s) of the final part leading to dimensional non-conformances of those feature(s). Non-conformances in the feature(s) of the aluminum alloy are often problematic in use cases where adherence to strict dimensional tolerance(s) is necessary (e.g., aircraft manufacturing).

Typical remedies for a non-conforming feature of an aluminum alloy part include, for example, adding shims to fill in gaps, applying weights to re-form the non-conforming feature of the aluminum alloy part to within the dimensional tolerance, and the like. In some extreme cases, the aluminum alloy part is actually scrapped, which affects delivery schedules and often adds significant time and cost to re-make the part. Otherwise, the feature of the aluminum alloy part is subjected to additional heat treatments to heat the aluminum alloy part to a process temperature, and the part then re-formed while at the process temperature. However, re-forming aluminum alloy parts at the process temperature usually results in degrading the material properties of the aluminum alloy part (i.e., reduced mechanical performance) so that the re-formed aluminum alloy parts still need to be scrapped in some instances.

Therefore, a need exists for remedying a non-conforming feature of an aluminum alloy part without sacrificing mechanical performance, while still meeting a specified dimensional tolerance.

BRIEF SUMMARY

The present disclosure is directed to methods and apparatuses for remedying a non-conforming feature of an aluminum alloy part. One example of the present disclosure is directed to a method comprising: identifying a yield strength as a function of temperature for a designation of an aluminum alloy part; determining a stress to be applied to a non-conforming feature of the aluminum alloy part to re-form the non-conforming feature to within a dimensional tolerance; correlating the stress to the identified yield strength to determine a process temperature of the aluminum alloy part upon applying the stress to the feature; determining a time duration for applying the stress to the feature at the determined process temperature, the time duration being a function of at least the stress and the determined process temperature; and applying the stress to the feature of the aluminum alloy part, the feature being restrained to oppose the stress, while heating the feature to the determined process temperature, and maintaining the application of the stress and the heat to the feature for the time duration in order to re-form the restrained feature to within the dimensional tolerance.

The present disclosure also provides, in another example, an apparatus comprising: a first portion arranged to restrain a non-conforming feature of an aluminum alloy part to oppose a stress applied to the feature; and a second portion arranged to apply the stress to the restrained feature; wherein the restrained feature is heated to a process temperature corresponding to an identified yield strength for a designation of the aluminum alloy part and the stress is applied to the restrained feature for a time duration, the time duration being a function of the stress and the process temperature, in order to re-form the restrained feature to within a dimensional tolerance.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

BRIEF DESCRIPTION OF THE DRAWING(S)

Figure 2:
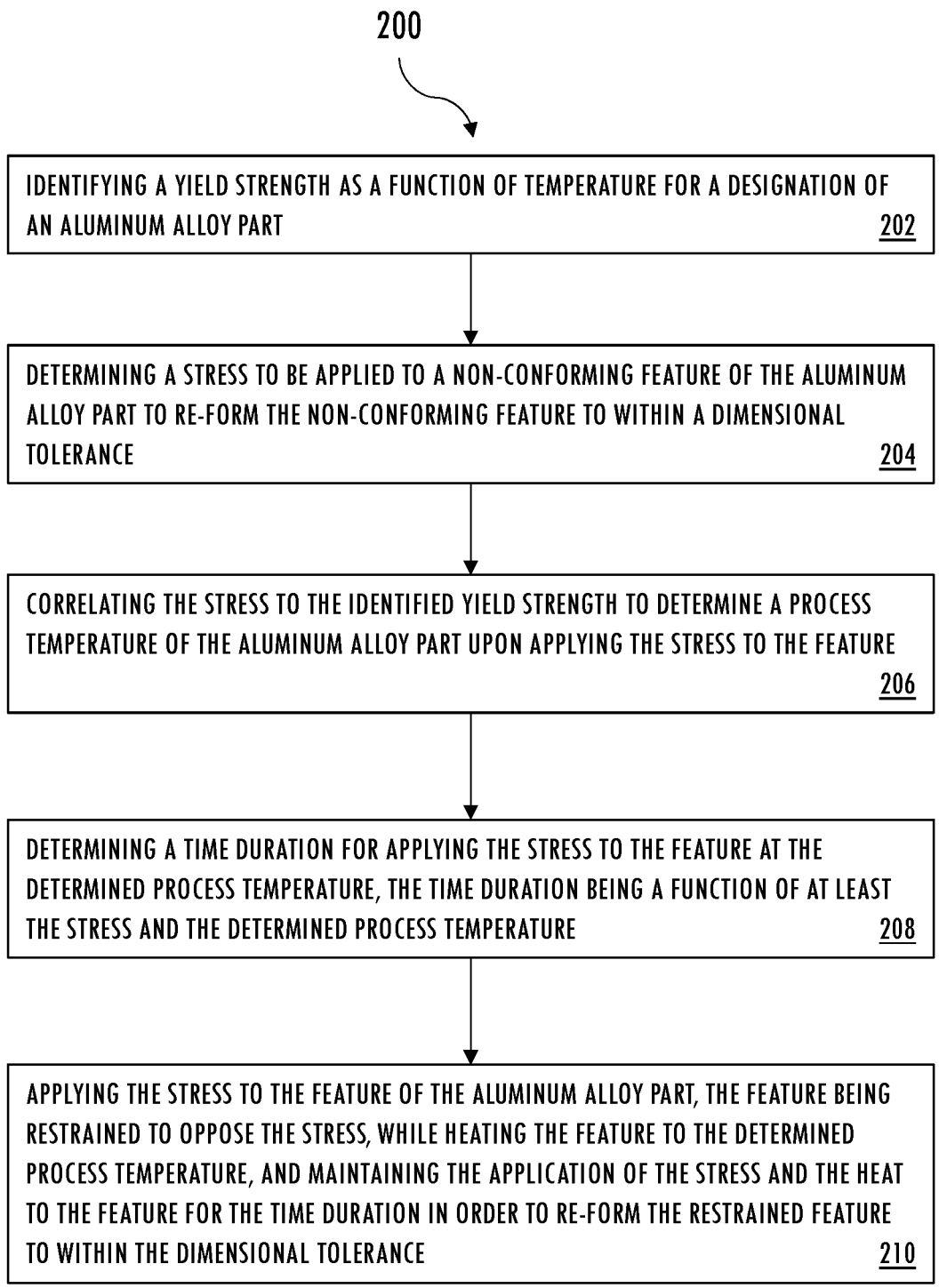

Having thus described examples of the disclosure in general terms, reference will now be made to the accompanying drawings, which are not necessarily drawn to scale, and wherein:

FIG. 1 illustrates an apparatus for remedying a non-conforming feature of an aluminum alloy part; and FIG. 2 illustrates a method of remedying a non-conforming feature of an aluminum alloy part.

DETAILED DESCRIPTION

Some examples of the present disclosure will now be described more fully hereinafter with reference to the accompanying drawings, in which some, but not all examples of the disclosure are shown. Indeed, various examples of the disclosure may be embodied in many different forms and should not be construed as limited to the examples set forth herein; rather, these examples are provided so that this disclosure will be thorough and complete, and will fully convey the scope of the disclosure to those skilled in the art. For example, unless otherwise indicated, reference to something as being a first, second or the like should not be construed to imply a particular order. Also, something described as being above something else (unless otherwise indicated) may instead be below, and vice versa; and similarly, something described as being to the left of something else may instead be to the right, and vice versa. Like reference numerals refer to like elements throughout.

Examples of the present disclosure are generally directed to a method and apparatus for remedying a non-conforming feature of an aluminum alloy part. As disclosed herein, the method and apparatus are used in aerospace applications to remedy non-conforming features (e.g., stiffeners, parallel surfaces, etc.) of an aluminum alloy. However, the method and apparatus disclosed herein also are usable in any application where one or more features of wrought or forged aluminum alloy parts require re-forming to within a desired dimensional tolerance. As used herein, "dimensional tolerance(s)" refers to an amount that a given dimension or geometric characteristic of a feature is allowed to vary without affecting the mechanical performance of the aluminum alloy part. The dimensional tolerances are chosen depending on usage of the part, where parts utilized in aerospace applications require strict dimensional compliance and as such have narrow dimensional tolerances. Generally, a dimensional tolerance is established during the design phase of the part, such that the "dimensional tolerance" used herein is determined prior to performing the disclosed method.

An aluminum alloy part is typically formed using conventional forming methods (e.g., rolling, forging, machining, etc.) However, one or more features of the formed aluminum alloy part in some instances do not conform to within a desired dimensional tolerance. This is due, for example, to residual stresses retained by the aluminum alloy part while being formed or worked to shape. These stresses often cause bending, twisting, and/or bowing of the aluminum alloy part thereby leading to dimensional non-conformances or failures to adhere to the specified dimensional tolerance. Dimensional non-conformances also often appear on previously conforming parts due to small changes in fabrication or machining methods. Accordingly, the method and apparatus disclosed herein remedy non-conforming feature(s) of the aluminum alloy part through heating the non-conforming feature(s), the feature(s) being restrained in some instances, to a process temperature corresponding to an identified yield strength for a designation of the aluminum alloy part and applying a stress to the restrained feature for a time duration, the time duration being a function of at least the stress and the process temperature, in order to re-form the restrained feature to within a dimensional tolerance.

In some example instances, a thermally-activated elastic straightening or "pseudo-creep" mechanism is used to elastically deform the non-conforming feature of the aluminum alloy part to conform to within the desired dimensional tolerance. The thermally-activated elastic straightening mechanism is activated when the non-conforming feature of the aluminum alloy part is subjected to heat and stress, the stress being below a yield strength of the aluminum alloy. Once activated, the thermally-activated elastic straightening mechanism allows for moving the non-conforming feature a re-forming distance to within the desired dimensional tolerance without sacrificing mechanical performance.

For example, and as illustrated in FIG. 1, an apparatus 100 for remedying a non-conforming feature 102 of an aluminum alloy part 104 is illustrated. The aluminum alloy part 104 comprises, in particular aspects, a part, a component, a module, a product, and/or any other element formed from a wrought or forged aluminum alloy. For example, the aluminum alloy part 104 has a designation of a wrought aluminum alloy series 2000 in a T6XX, T72, or T8XX condition; a wrought aluminum alloy series 6000 in a T6XX condition; or a wrought aluminum alloy series 7000 in a T6XX, T76XX, T73XX, and a T74XX condition.

The apparatus 100 comprises, in one aspect, a first portion 106 arranged to restrain the non-conforming feature 102 of the aluminum alloy part 104 to oppose a stress applied to the feature 102. For example, the first portion 106 comprises a vise, a clamp, a platen, or the like, which is arranged with respect to the aluminum alloy part 104 so as to restrain the non-conforming feature 102 and oppose the stress applied to the feature 102. In this example, the first portion 106 is capable of restraining the non-conforming feature 102 of a part 104 having a thickness of between about 40 to about 150 thousandths of an inch. However, other part thicknesses are also contemplated by this disclosure.

The first portion 106 is, in some aspects, conformable to the aluminum alloy part 104 to restrain the non-conforming feature 102 to oppose the stress applied thereto. For example, and as illustrated in FIG. 1, the first portion 106 has a cross-sectional shape, e.g., an inverted "L" shape, which is complementary to a cross-sectional shape, e.g., an inverted "T" shape of the aluminum alloy part 104, such that a horizontal portion of the "T" shape is restrained so as to oppose a stress applied to the non-conforming feature 102 (e.g., the vertical portion of the inverted "T" shape not being perpendicular to the horizontal portion of the "T" shape). The first portion 106 is configured such that, when the non-conforming feature 102 is re-formed back into a disposition perpendicular to the horizontal portion of the "T" shape, an end of the first portion 106 will be in direct contact with the non-conforming feature 102 so as to oppose the stress applied to the feature 102.

In some other aspects, the first portion 106 is arranged to accommodate one or more aluminum alloy parts of varying shapes, sizes, and cross-sections, or is arranged to receive the aluminum alloy part 104 and "over-form" or form the feature 102 to a shape other than the desired shape such that natural relaxation of the aluminum results in achieving the desired shape (e.g., conforming to within the dimensional tolerance).

In some aspects, the apparatus 100 also comprises a second portion 108 arranged to apply the stress to the restrained feature 102. For example, the second portion 108 is arranged to apply a stress that is sufficient to re-form the non-conforming feature 102 to within a dimensional tolerance. This stress ($\sigma$) is determined by calculating an applied force (F) per unit area (A) (EQUATION 1):

$$\sigma = F/A, \quad\quad\quad\quad \text{EQUATION 1:}$$

where F is measured in Newtons, A is measured in square meters, and $\sigma$ is measured in N per square meters or Pascals (Pa).

However, prior to determining the stress, the feature 102 of the aluminum alloy part 104 is measured to determine if it is within the dimensional tolerance. In some particular aspects, the method and apparatus disclosed herein are able to re-form (or move) the non-conforming feature a re-forming distance of about 5-500 thousandths of an inch to within the desired dimensional tolerance. However, other distances greater than or less than 5-500 thousandths of an inch are also contemplated within this disclosure.

If the measurement of the feature (e.g., feature 102) does conform to the desired dimensional tolerance, then further processing of the part continues and the disclosed method is not required and thus not performed. However, if the measurement of the feature does not conform to the desired dimensional tolerance, then a yield strength (or more than one yield strength) is identified or selected as a function of temperature for a designation of the aluminum alloy part 104. The yield strength indicates the elastic limit of the aluminum alloy part or a maximum extent to which the non-conforming feature is stretchable without permanent alteration of size or shape. Since different aluminum alloy parts have different shapes and therefore elastic limits, the yield strength or strengths identified will vary depending on at least the shape of the part, the designation of the aluminum alloy part (e.g., T6XX), the part thickness, and the corresponding temperature. In some aspects, a known materials database, such as ASM International's ASM ALLOY CENTER DATABASE™, is accessed in order to identify the yield strength associated with the designation of the aluminum alloy part, as well as determine corresponding process temperatures and time durations.

For example, the known materials database includes wrought aluminum alloy series 2000 in a T6XX, T72, or T8XX condition between 200 degrees Fahrenheit (° F.) and 400° F. for ½ to 32 hours at 10-50 kilopound per square inch (ksi) up to a seven (7) inch thick part; a wrought aluminum alloy series 6000 in a T6XX condition between 200° F. and 400° F. for ¾ to 32 hours at 10-38 ksi and up to an eight (8) inch thick part; and a wrought aluminum alloy series 7000 in a T6XX, T76XX, T73XX, and a T74XX condition between 200° F. and 375° F. for ½ to 32 hours at 10-65 ksi and up to a ten (10) inch thick part. For purposes of comparison, in some example aspects, two different yield strengths of the designation of the aluminum alloy part are identified at "low" and "high" temperatures (e.g., 200° F. and 375/400° F.), where the corresponding yield strengths vary as a function of the temperature. Additional yield strengths (e.g., three, four, five, six, etc.) of aluminum alloy designation also are identified as a function of temperature, if desired.

Once the yield strength is identified, the calculated stress (i.e., from EQUATION 1) is correlated to the identified yield strength to determine a process temperature of the aluminum alloy part 104. Depending on how many yield strengths are identified (i.e., one yield strength, two yield strengths, three yield strengths, etc.), correlating the stress to the identified yield strength to determine the process temperature comprises correlating the stress to one yield strength, two yield strengths, three yield strengths, four yield strengths, etc. More particularly, the calculated stress is compared to the identified yield strength(s) in order to determine whether the calculated stress is less than the yield strength(s). If the calculated stress is less than at least one of the identified yield strength(s), then the calculated stress is usable to re-form the non-conforming feature 102. This is due to the thermally-activated elastic straightening mechanism. In this manner, and based on the aluminum alloy designations available, the calculated stress is generally between about 10 kilopounds per square inch to about 65 kilopounds per square inch.

Based on the correlation of stress to the identified one yield strength, two yield strengths, three yield strengths, etc., a process temperature (the temperature at which the part is heated to re-form the non-conforming feature in conjunction with the applied stress) is then determinable as the temperature corresponding to the identified yield strength. In one particular aspect, if the stress is less than each of two or more identified yield strengths, then the process temperature is the temperature corresponding to a lower of the two identified yield strengths. In another particular aspect, if the stress is greater than one of the identified yield strengths, but less than the other of the identified yield strengths, then the process temperature is the temperature corresponding to the higher of the two identified yield strengths. For example, the stress calculated in EQUATION 1 is correlated or compared to the yield strengths at each selected temperature, e.g., the "low" temperature (e.g., 200° F.) and the "high" temperature (e.g., 375/400° F.) and determined to be less than both the low temperature and the high temperature. Accordingly, in this example, the process temperature is determined as the temperature corresponding to the lower of the two identified yield strengths or the "low" temperature, e.g., 200° F. In this manner, and based on the aluminum alloy designations available, the process temperature is generally between about 200° F. and about 400° F.

Once the process temperature is determined, then a time duration for applying the stress to the feature 102 at the determined process temperature is determined. The time duration is at least a function of the stress and the determined process temperature. However, in some aspects, there are other variables that affect the time duration such as, for example, re-forming distance, part thickness, etc. The time duration is, in some particular aspects, the time corresponding to the identified yield strength and process temperature for the designation of the aluminum alloy part 104. For example, the time duration for a non-conforming feature 102 of a part 104 designated as a wrought aluminum alloy series 2000 in a T72 is 0.5 hours to 32 hours, where the restrained feature 102 is monitored at regular intervals within this time duration to determine whether the restrained feature 102 has moved the re-forming distance.

Other aspects of determining the time duration, include, for example, determining the time duration as a function of the re-forming distance, a bending moment, the calculated stress, and material properties of the part 104. In this manner, and based on the aluminum alloy designations available, the time duration is generally between about 0.5 hours and about 32 hours.

Once the stress, the process temperature, and the time duration are determined, then the non-conforming feature is ready to be re-formed. Notably, physical apparatus constraints, such as process temperature or stress uniformity, sometimes warrant adjusting one or more of the process temperature, stress, and time duration so as to allow for efficient, low-cost remedying of the non-conforming feature. For example, a large apparatus is necessary for remedying a non-conforming feature of large aluminum alloy parts, such as ribs or spars. In this example, it is sometimes advantageous to apply a "low" stress for a "short" time duration at a "high" process temperature to the non-conforming feature of the large aluminum alloy part so as to allow for a lower capital cost of the apparatus. In another example, using the large apparatus to remedy a non-conforming feature with a complex shape, it is sometimes advantageous to apply a "high" stress for a "long" time duration at a "low" process temperature so as to maintain uniformity of the process temperature over the entire aluminum alloy part, require less energy input to the apparatus to maintain that process temperature, and allow for a shorter process cycle time (i.e., it takes less time to heat up and cool down the large apparatus at a lower process temperature than a higher process temperature). Alternatively, depending on the physical constraints of the apparatus used to remedy the non-conforming feature, it is advantageous to apply a "high stress" for a "short" time duration at a "low" process temperature, apply a "low" stress for a "long" time duration at a "low" process temperature, or apply a "low" stress for a "short" time duration at a "low" temperature.

In some aspects, the apparatus 100 further comprises a heating element 110, as illustrated in FIG. 1, which is arranged to heat the restrained feature 102 to the process temperature. In some aspects, for example, the apparatus 100 is a furnace, or other apparatus capable of heating the part 104 to and maintaining the process temperature for the determined time duration. In some examples, the heating element 110 is an ignition mechanism that ignites a source of fuel to create a flame, an electric resistive heating element, or the like. Further, in some aspects, the heating element 110 is controllable through a control device 112 to produce enough heat to heat the non-conforming feature 102 to the process temperature for the time duration. The control device 112 is, in some aspects, a mechanical switch, a bellows, a non-transitory computer readable medium, any combination thereof, or the like, which is capable of being in communication with and controlling at least the heating element 110.

Accordingly, in some aspects, the non-conforming feature 102 is restrained in the first portion 106 of the apparatus 100 and the stress is applied to the restrained feature 102 using the second portion 108 of the apparatus 100. Then, the feature 102 is heated to the determined process temperature using the heating element 110 operably engaged therewith. Optionally, the feature 102 is monitored at time intervals within the time duration to determine whether the feature 102 has moved the re-forming distance. Once the feature 102 has moved the re-forming distance and/or after the determined time duration, the application of the heat from the heating element 110 and the application of the stress from the second portion 108 of the apparatus 100 are stopped so as to reduce a temperature of the restrained feature 102 to below the determined process temperature. In some aspects, the control device 112 is used to start, stop, and monitor the re-forming of the non-conforming feature 102.

After the temperature of the restrained feature 102 is reduced to below the determined process temperature, the feature 102 is removed from the first portion 106 and is measured to determine whether the re-formed feature 102 is within the dimensional tolerance. Notably, the aluminum alloy part is removable from the apparatus 100 as soon as the restrained feature 102 is heated to the process temperature. However, leaving the feature 102 restrained until the temperature thereof is less than the process temperature is advantageous as distortion resulting from cooling is reduced while the feature 102 is restrained. If the feature 102 has not moved the re-forming distance, the feature 102 is restrained again and the heating process is repeated until the determined time duration at the determined process temperature is reached.

Alternatively, if the feature 102 is heated and restrained for only a fraction of the determined time duration, then the feature 102 is restrained again and the heating process is repeated for the remainder of that fraction of the time duration at a second process temperature. For example, if a 6061-T6XX aluminum alloy part is run for a time duration of five hours at a first process temperature of 300° F., then the 6061-T6XX aluminum alloy part can only be run for a time duration of 16 hours at a second process temperature of 275° F. or a time duration of 1.5 hours at a second process temperature of 350° F. In this manner, the method described herein is repeated to determine a second process temperature, the second process temperature being different than the initial or previously determined process temperature.

If the feature 102 has moved the re-forming distance, the part 104 is dimensionally tolerant and is able to be utilized as desired. In this manner, the first portion 106 and the second portion 108 of the apparatus 100 operably cooperate to move the non-conforming feature 102 the re-forming distance (i.e., re-form the non-conforming feature 102 about 5-500 thousandths of an inch) to within the dimensional tolerance, without affecting the mechanical performance of the aluminum alloy part 104.

Referring now to FIG. 2, a method 200 of remedying a non-conforming feature of an aluminum alloy part is illustrated. The method 200 comprises identifying a yield strength as a function of temperature for a designation of the aluminum alloy part, in a first step 202. The method further comprises determining a stress to be applied to the feature to re-form the non-conforming feature to within a dimensional tolerance, in a second step 204. The method further comprises correlating the stress to the identified yield strength to determine a process temperature of the aluminum alloy part upon applying the stress to the feature, in a third step 206. The method further comprises determining a time duration for applying the stress to the feature at the determined process temperature, the time duration being a function of at least the stress and the determined process temperature, in a fourth step 208. The method further comprises applying the stress to the feature of the aluminum alloy part, the feature being restrained to oppose the stress, while heating the feature to the determined process temperature, and maintaining the application of the stress and the heat to the feature for the time duration in order to re-form the restrained feature to within the dimensional tolerance, in a fifth step 210.

Clause 1: A method comprises identifying a yield strength as a function of temperature for a designation of an aluminum alloy part, determining a stress to be applied to a non-conforming feature of the aluminum alloy part to re-form the non-conforming feature to within a dimensional tolerance correlating the stress to the identified yield strength to determine a process temperature of the aluminum alloy part upon applying the stress to the feature, determining a time duration for applying the stress to the feature at the determined process temperature, the time duration being a function of at least the stress and the determined process temperature, and applying the stress to the feature of the aluminum alloy part, the feature being restrained to oppose the stress, while heating the feature to the determined process temperature, and maintaining the application of the stress and the heat to the feature for the time duration in order to re-form the restrained feature to within the dimensional tolerance.

Clause 2: The method of Clause 1, wherein determining the stress comprises calculating the stress based on a force to be applied to the feature per unit area.

Clause 3: The method of Clause 1 or 2, wherein identifying the yield strength comprises identifying two or more yield strengths as a function of temperature.

Clause 4: The method of Clause 3, wherein correlating the stress to the identified yield strength comprises correlating the stress to the two or more identified yield strengths to determine the process temperature of the aluminum alloy part upon applying the stress to the feature, and wherein if the stress is less than each of the two or more identified yield strengths, then the process temperature is the temperature corresponding to a lower of the two identified yield strengths and if the stress is greater than one of the identified yield strengths, but less than the other of the identified yield strengths, then the process temperature is the temperature corresponding to the higher of the two identified yield strengths.

Clause 5: The method of any of Clauses 1-4, wherein identifying the yield strength comprises identifying the yield strength as a function of temperature for the aluminum alloy part having the designation of at least one of a wrought aluminum alloy series 2000 in a T6XX, T72, or T8XX condition; a wrought aluminum alloy series 6000 in a T6XX condition; and a wrought aluminum alloy series 7000 in a T6XX, T76XX, T73XX, and a T74XX condition.

Clause 6: The method of any of Clauses 1-5, wherein correlating the stress to the identified yield strength to determine the process temperature comprises correlating the stress to the identified yield strength to determine the process temperature of between about 200° F. and about 400° F.

Clause 7: The method of any of Clauses 1-6, wherein determining the stress comprises determining the stress to be applied to the feature to re-form the non-conforming feature about 5-500 thousandths of an inch to within the dimensional tolerance.

Clause 8: The method of any of Clauses 1-7, wherein determining the time duration comprises determining the time duration of between about 0.5 hours to about 32 hours.

Clause 9: The method of any of Clauses 1-8, wherein determining the stress comprises determining the stress of between about 10 kilopounds per square inch to about 65 kilopounds per square inch.

Clause 10: The method of any of Clauses 1-9, further comprising restraining the non-conforming feature in a first portion of an apparatus and applying the stress to the restrained feature using a second portion of the apparatus.

Clause 11: The method of Clause 10, further comprising heating the feature to the determined process temperature using a heating element operably engaged therewith, and stopping the application of the heat from the heating element and the application of the stress from the second portion of the apparatus after the determined time duration so as to reduce a temperature of the restrained feature to below the determined process temperature.

Clause 12: The method of any of Clauses 1-11, further comprising measuring the re-formed feature of the aluminum alloy part to determine whether the re-formed feature is within the dimensional tolerance.

Clause 13: An apparatus comprises a first portion arranged to restrain a non-conforming feature of an aluminum alloy part to oppose a stress applied to the feature and a second portion arranged to apply the stress to the restrained feature, wherein the restrained feature is heated to a process temperature corresponding to an identified yield strength for a designation of the aluminum alloy part and the stress is applied to the restrained feature for a time duration, the time duration being a function of the stress and the process temperature, in order to re-form the restrained feature to within a dimensional tolerance.

Clause 14: The apparatus of Clause 13, wherein the first portion is conformable to the aluminum alloy part to restrain the non-conforming feature of the aluminum alloy part to oppose the stress applied to the feature.

Clause 15: The apparatus of Clause 13 or 14, wherein the first portion and the second portion operably cooperate to re-form the non-conforming feature about 5-500 thousandths of an inch to within the dimensional tolerance.

Clause 16: The apparatus of any of Clauses 13-15, wherein the first portion is arranged to restrain the non-conforming feature having a thickness of between about 40 to about 150 thousandths of an inch.

Clause 17: The apparatus of any of Clauses 13-16, further comprising a heating element arranged to heat the restrained feature to the process temperature.

Clause 18: The apparatus of Clause 17, wherein the heating element is arranged to heat the restrained feature to the process temperature of between about 200° F. and about 400° F. for the time duration of between about 0.5 hours and about 32 hours.

Clause 19: The apparatus of Clause 17 or 18, wherein the second portion is arranged to stop the application of stress to the restrained feature and the heating element is arranged to stop application of heat after the time duration so as to reduce a temperature of the restrained feature to below the process temperature.

Clause 20: The apparatus of any of Clauses 13-19, wherein the second portion is arranged to apply the stress of between about 10 kilopounds per square inch to about 65 kilopounds per square inch.

Many modifications and other examples of the disclosure set forth herein will come to mind to one skilled in the art to which the disclosure pertains having the benefit of the teachings presented in the foregoing description and the associated drawings. Therefore, it is to be understood that the disclosure is not to be limited to the specific examples disclosed and that modifications and other examples are intended to be included within the scope of the appended claims. Moreover, although the foregoing description and the associated drawings describe examples in the context of certain example combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    identifying a yield strength as a function of temperature for a designation of an aluminum alloy part;
    determining a stress to be applied to a non-conforming feature of the aluminum alloy part to re-form the non-conforming feature to within a dimensional tolerance;
    correlating the stress to the identified yield strength to determine a process temperature of the aluminum alloy part upon applying the stress to the feature;
    determining a time duration for applying the stress to the feature at the determined process temperature, the time duration being a function of at least the stress and the determined process temperature;
    applying the stress to the feature of the aluminum alloy part, the feature being restrained to oppose the stress, while heating the feature to the determined process temperature, and maintaining the application of the stress and the heat to the feature for the time duration in order to re-form the restrained feature to within the dimensional tolerance; and
    restraining the non-conforming feature in a first portion of an apparatus and applying the stress to the restrained feature using a second portion of the apparatus.

2. The method of claim 1, wherein determining the stress comprises calculating the stress based on a force to be applied to the feature per unit area.

3. The method of claim 1, wherein identifying the yield strength comprises identifying two or more yield strengths as a function of temperature.

4. The method of claim 3, wherein correlating the stress to the identified yield strength comprises correlating the stress to the two or more identified yield strengths to determine the process temperature of the aluminum alloy part upon applying the stress to the feature, and wherein:
    if the stress is less than each of the two or more identified yield strengths, then the process temperature is the temperature corresponding to a lower of the two identified yield strengths; and
    if the stress is greater than one of the identified yield strengths, but less than the other of the identified yield strengths, then the process temperature is the temperature corresponding to the higher of the two identified yield strengths.

5. The method of claim 1, wherein identifying the yield strength comprises identifying the yield strength as a function of temperature for the aluminum alloy part having the designation of at least one of a wrought aluminum alloy series 2000 in a T6XX, T72, or T8XX condition; a wrought aluminum alloy series 6000 in a T6XX condition; and a wrought aluminum alloy series 7000 in a T6XX, T76XX, T73XX, and a T74XX condition.

6. The method of claim 1, wherein correlating the stress to the identified yield strength to determine the process temperature comprises correlating the stress to the identified yield strength to determine the process temperature of between about 200° F. and about 400° F.

7. The method of claim 1, wherein determining the stress comprises determining the stress to be applied to the feature to re-form the non-conforming feature about 5-500 thousandths of an inch to within the dimensional tolerance.

8. The method of claim 1, wherein determining the time duration comprises determining the time duration of between about 0.5 hours to about 32 hours.

9. The method of claim 1, wherein determining the stress comprises determining the stress of between about 10 kilopounds per square inch to about 65 kilopounds per square inch.

10. The method of claim 1, further comprising heating the feature to the determined process temperature using a heating element operably engaged therewith, and stopping the application of the heat from the heating element and the application of the stress from the second portion of the apparatus after the determined time duration so as to reduce a temperature of the restrained feature to below the determined process temperature.

* * * * *